United States Patent
Matsumoto

(10) Patent No.: US 11,115,495 B2
(45) Date of Patent: *Sep. 7, 2021

(54) SERVER, METHOD OF CONTROLLING SERVER, AND PROGRAM

(71) Applicant: GREE, Inc., Minato-ku (JP)

(72) Inventor: Takashi Matsumoto, Tokyo (JP)

(73) Assignee: GREE, Inc., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,806

(22) Filed: Oct. 4, 2018

(65) Prior Publication Data
US 2019/0037048 A1    Jan. 31, 2019

Related U.S. Application Data

(63) Continuation of application No. 14/836,458, filed on Aug. 26, 2015, now Pat. No. 10,122,821, which is a
(Continued)

(30) Foreign Application Priority Data

Feb. 28, 2013 (JP) ................................ 2013-039273

(51) Int. Cl.
*G06F 15/16* (2006.01)
*H04L 29/08* (2006.01)
(Continued)

(52) U.S. Cl.
CPC .............. *H04L 67/32* (2013.01); *H04L 51/04* (2013.01); *H04L 51/046* (2013.01); *H04L 51/08* (2013.01);
(Continued)

(58) Field of Classification Search
CPC ......... H04L 67/32; H04L 51/18; H04L 51/10; H04L 51/08; H04L 51/04; H04L 51/32;
(Continued)

(56) References Cited

U.S. PATENT DOCUMENTS 6,398,651 B1    6/2002    Yamada
7,913,176 B1    3/2011    Blattner et al.
(Continued)

FOREIGN PATENT DOCUMENTS

JP    2000325528 A    11/2000
JP    2002-292125      10/2002
(Continued)

OTHER PUBLICATIONS

International Search Report dated Apr. 8, 2014 for PCT/JP2014/055883 filed Feb. 27, 2014, 2 pages.
(Continued)

*Primary Examiner* — John B Walsh
(74) *Attorney, Agent, or Firm* — Oblon, McClelland, Maier & Neustadt, L.L.P.

(57) ABSTRACT

Provided is a system that includes circuitry that transmits first image data to a second communication terminal in response to a first request for image transmission from a first communication terminal; transmits second image data to the first communication terminal in response to a second request for image transmission from the second communication terminal; and transmits, in a case that the first request for image transmission and the second request for image transmission are a predetermined combination, third image data corresponding to the predetermined combination to the first communication terminal and the second communication terminal.

13 Claims, 10 Drawing Sheets

Related U.S. Application Data continuation of application No. PCT/JP2014/055883, filed on Feb. 27, 2014.

(51) Int. Cl.
  *H04L 12/58* (2006.01)
  *H04N 21/4788* (2011.01)
  *H04N 21/235* (2011.01)
  *H04N 21/239* (2011.01)

(52) U.S. Cl.
  CPC .............. *H04L 51/10* (2013.01); *H04L 51/18* (2013.01); *H04L 51/32* (2013.01); *H04L 67/02* (2013.01); *H04N 21/2353* (2013.01); *H04N 21/2393* (2013.01); *H04N 21/4788* (2013.01)

(58) Field of Classification Search
  CPC ... H04L 67/02; H04L 51/046; H04N 21/2393; H04N 21/2353; H04N 21/4788
  See application file for complete search history.

(56) References Cited

U.S. PATENT DOCUMENTS

| | | | |
|---|---|---|---|
| 9,183,554 B1* | 11/2015 | Courtright | G06Q 20/202 |
| 10,122,821 B2* | 11/2018 | Matsumoto | H04N 21/4788 |
| 2004/0147315 A1 | 7/2004 | Monden | |
| 2005/0021624 A1 | 1/2005 | Herf et al. | |
| 2009/0068991 A1 | 3/2009 | Aaltonen et al. | |
| 2009/0257730 A1 | 10/2009 | Chen et al. | |
| 2010/0042484 A1* | 2/2010 | Sipes | G06Q 30/0241 |
| | | | 705/14.4 |
| 2010/0106612 A1 | 4/2010 | Gupta et al. | |
| 2010/0179991 A1 | 7/2010 | Lorch et al. | |
| 2011/0007077 A1 | 1/2011 | Kamath et al. | |
| 2011/0209198 A1 | 8/2011 | Blattner et al. | |
| 2012/0151381 A1 | 6/2012 | Schiff et al. | |
| 2012/0327183 A1 | 12/2012 | Fujii | |
| 2013/0104070 A1* | 4/2013 | Blake | G06Q 50/01 |
| | | | 715/777 |
| 2013/0278781 A1* | 10/2013 | Chung | H04N 1/00246 |
| | | | 348/207.1 |
| 2014/0082198 A1 | 3/2014 | Blattner et al. | |
| 2014/0223548 A1 | 8/2014 | Wassingbo | |
| 2017/0171358 A1* | 6/2017 | Teshima | G06T 3/4092 |

FOREIGN PATENT DOCUMENTS

| | | | |
|---|---|---|---|
| JP | 2002315970 A | 10/2002 | |
| JP | 2003-038856 A | 2/2003 | |
| JP | 2004-173940 A | 6/2004 | |
| JP | 2005100128 A | 4/2005 | |
| JP | 2006-326021 A | 12/2006 | |
| JP | 2010140083 A | 6/2010 | |
| JP | 2013009073 A | 1/2013 | |
| JP | 2019-23935 A | 2/2019 | |
| WO | WO 2009/077621 A1 | 6/2009 | |

OTHER PUBLICATIONS

Office Action dated Dec. 15, 2015 in Japanese Patent Application No. 2015-229828 (with English translation).
Jon Russell: "Mobile Games Firm GREE Test Launches Messaging App Ahead of Global Rollout in 2013", GREE Tests Messaging App Ahead of 2013 Launch, XP055240134, Dec. 20, 2012, Retrieved from the Internet: URL:http://thenextweb.com/asia/2012/12/20/mobile-games-firm-gree-test-launches-messaging-app-ahead-of-global-rollout-in-2013/#gref, [rerieved on Jan. 11, 2016], 6 pages.
Extended European Search Report dated Jan. 25, 2016 in Patent Application No. 14757005.5.
Office Action dated Mar. 22, 2016 in Japanese Patent Application No. 2015-229828 (with English language translation).
Extended European Search Report (EESR) issued by European Patent Office dated Nov. 25, 2016, 8 pages.
European Office Action dated Apr. 21, 2017 in Patent Application No. 14 757 005.5.
Summons to attend oral proceedings pursuant to Rule 115(1) EPC dated Nov. 2, 2017 in European Patent Application No. 14757005.5.
Japanese Office Action dated Jan. 16, 2018 in Japanese Application No. 2017-079235 (with English translation), 9 pages.
Decision to Grant dated Aug. 6, 2019 in Japanese Patent Application No. 2018-210279 (with English translation), 5 pages.
Extended European Search Report dated Oct. 5, 2018 in European Patent Application No. 18188774.6, 11 pages.
European Office Action dated Jun. 12, 2018 in European Patent Application No. 14757005.5, 18 pages.
Japanese Office Action dated Jun. 12, 2018 in Japanese Patent Application No. 2017-079235, 6 pages (with unedited computer generated English translation).
Office Action dated Oct. 30, 2019 in European Patent Application No. 18 188 774.6. 7 pages.
Summons to attend oral proceedings pursuant to Rule 115(1) EPC issued Aug. 24, 2020 in Europe Patent Application No. 18 188 774.6-1208, 12 pgs.
Notice of Reasons for Refusal dated Nov. 12, 2020 issued in corresponding Japanese patent application No. 2019-162241 (with English translation).
Decision to Refuse European Patent Application dated May 3, 2021 issued in corresponding European Patent Application No. 18 188 77 4.6 (13 pages).

* cited by examiner

FIG. 2A

| First image | First request for image transmission |
|---|---|
| A1 | A1r |
| A2 | A2r |
| A3 | A3r |
| ... | ... |
| An | Anr |

FIG. 2B

| Second image | Second request for image transmission |
|---|---|
| B1 | B1r |
| B2 | B2r |
| B3 | B3r |
| ... | ... |
| Bn | Bnr |

FIG. 3

| First request for image transmission | First image data | Second request for image transmission | Second image data | Third image data |
|---|---|---|---|---|
| A1r | A1d | B1r | B1d | C1d |
| A2r | A2d | B2r | B2d | C2d |
| A3r | A3d | B3r | B3d | C3d |
| ... | ... | ... | ... | ... |
| Anr | And | Bnr | Bnd | Cnd |

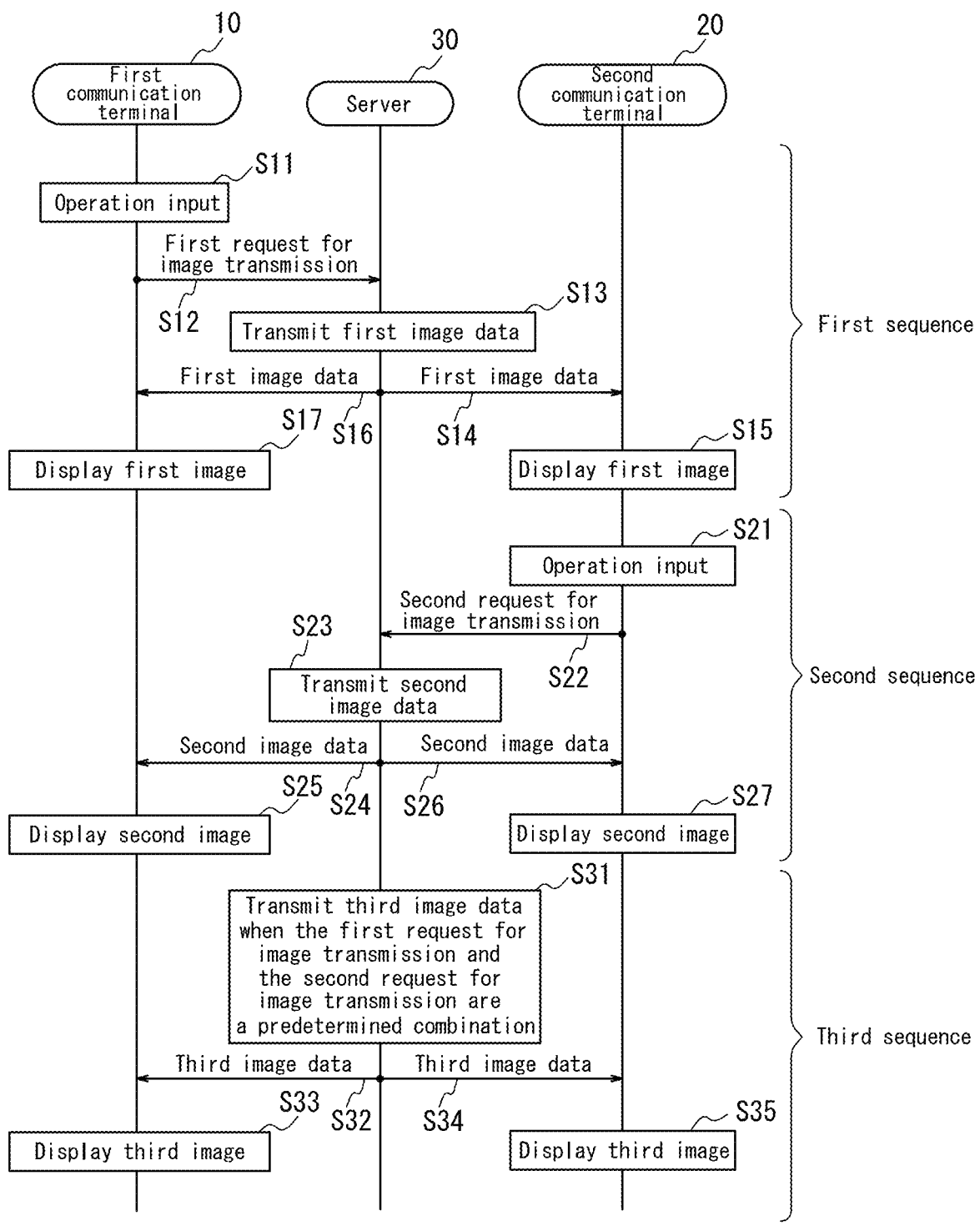

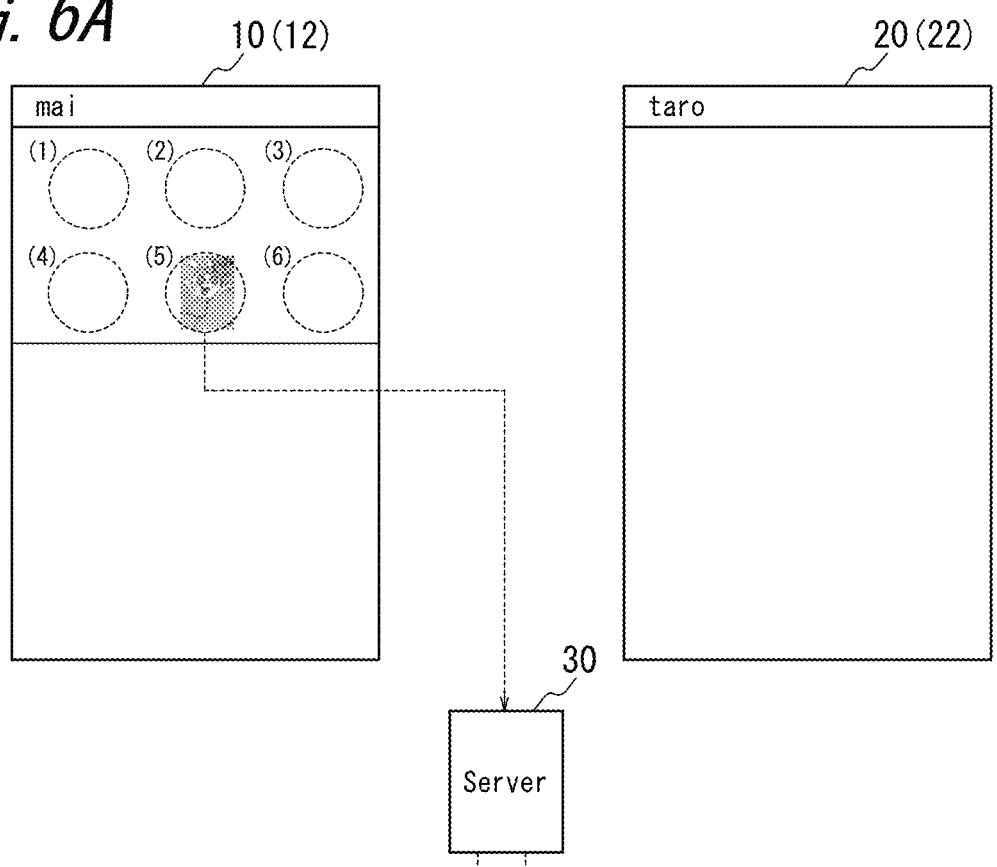
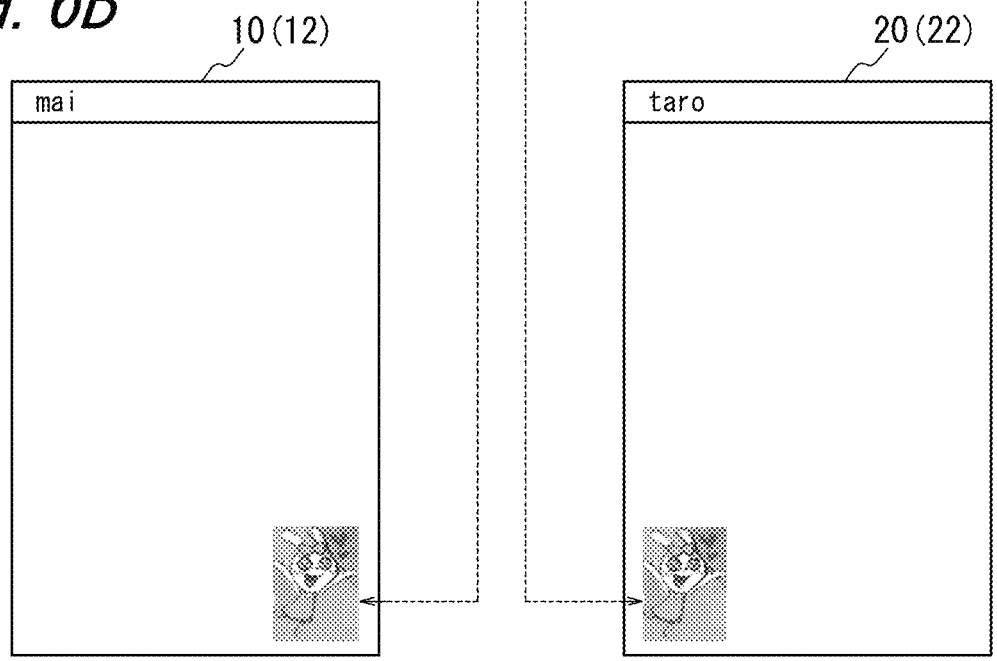

FIG. 9
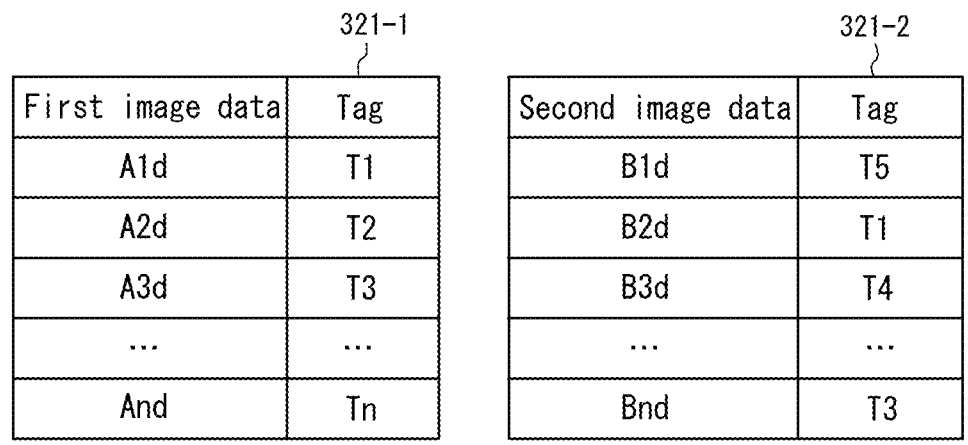
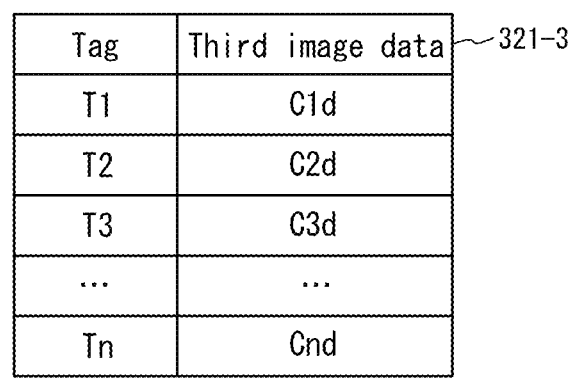

SERVER, METHOD OF CONTROLLING SERVER, AND PROGRAM

CROSS-REFERENCE TO RELATED APPLICATION

This application is a continuation of U.S. application Ser. No. 14/836,458, filed Aug. 26, 2015, which is a continuation application of PCT Application No. PCT/JP2014/055883, filed Feb. 27, 2014, which claims priority to and the benefit of Japanese Patent Application No. 2013-039273, filed Feb. 28, 2013, the entire contents of which are incorporated herein by reference.

TECHNICAL FIELD

This disclosure relates to a server, a method of controlling a server, and a program. In particular, this disclosure relates to a server in a communication system that implements exchange of images, to a method of controlling such a server, and to a program executed on a communication terminal that communicates with such a server.

BACKGROUND

Techniques are known for using a communication terminal such as a mobile phone or smart phone for message exchange, such as chat, with another communication terminal (for example, see JP 2010-140083 A (PTL 1)). Much of the application software (application) used in such techniques can exchange relatively short text simply and is provided with a user interface that makes message exchange with the other party easy to follow.

Some such applications also allow for the exchange of images as well as text messages. Images exchanged in this way include not only images shot by the user but also images of a variety of characters, illustrations, and the like that are prepared in advance by the application provider or the like and are acquirable by the user.

CITATION LIST

Patent Literature

PTL 1: JP 2010-140083 A

SUMMARY

Technical Problem

Conventional message exchange techniques go no further than the exchange of text, images, and the like.

Therefore, in light of this background, it could be helpful to provide a server in a communication system, a method of controlling a server, and a program that can stimulate the interest of users that exchange messages and increase the users' motivation to exchange messages.

Solution to Problem

A disclosed system for resolving the above issues is a system that includes circuitry that transmits first image data to a second communication terminal in response to a first request for image transmission from a first communication terminal; transmits second image data to the first communication terminal in response to a second request for image transmission from the second communication terminal; and transmits, in a case that the first request for image transmission and the second request for image transmission are a predetermined combination, third image data corresponding to the predetermined combination to the first communication terminal and the second communication terminal.

Advantageous Effect

The disclosed server, method of controlling a server, and program can stimulate the interest of users that exchange messages and increase the users' motivation to exchange messages.

BRIEF DESCRIPTION OF THE DRAWINGS

In the accompanying drawings:

FIGS. 2A and 2B illustrate an example of tables stored in a memory of a communication terminal;

FIG. 3 illustrates an example of a table stored in a memory of a server;

FIG. 5 is a sequence diagram at the time of image exchange in the communication system;

FIGS. 6A and 6B illustrate an example of a first image displayed on a display of the communication terminal;

FIG. 9 illustrates another example of tables stored in the memory of the server.

DETAILED DESCRIPTION

The following describes embodiments.

Embodiment 1

Figure 1:
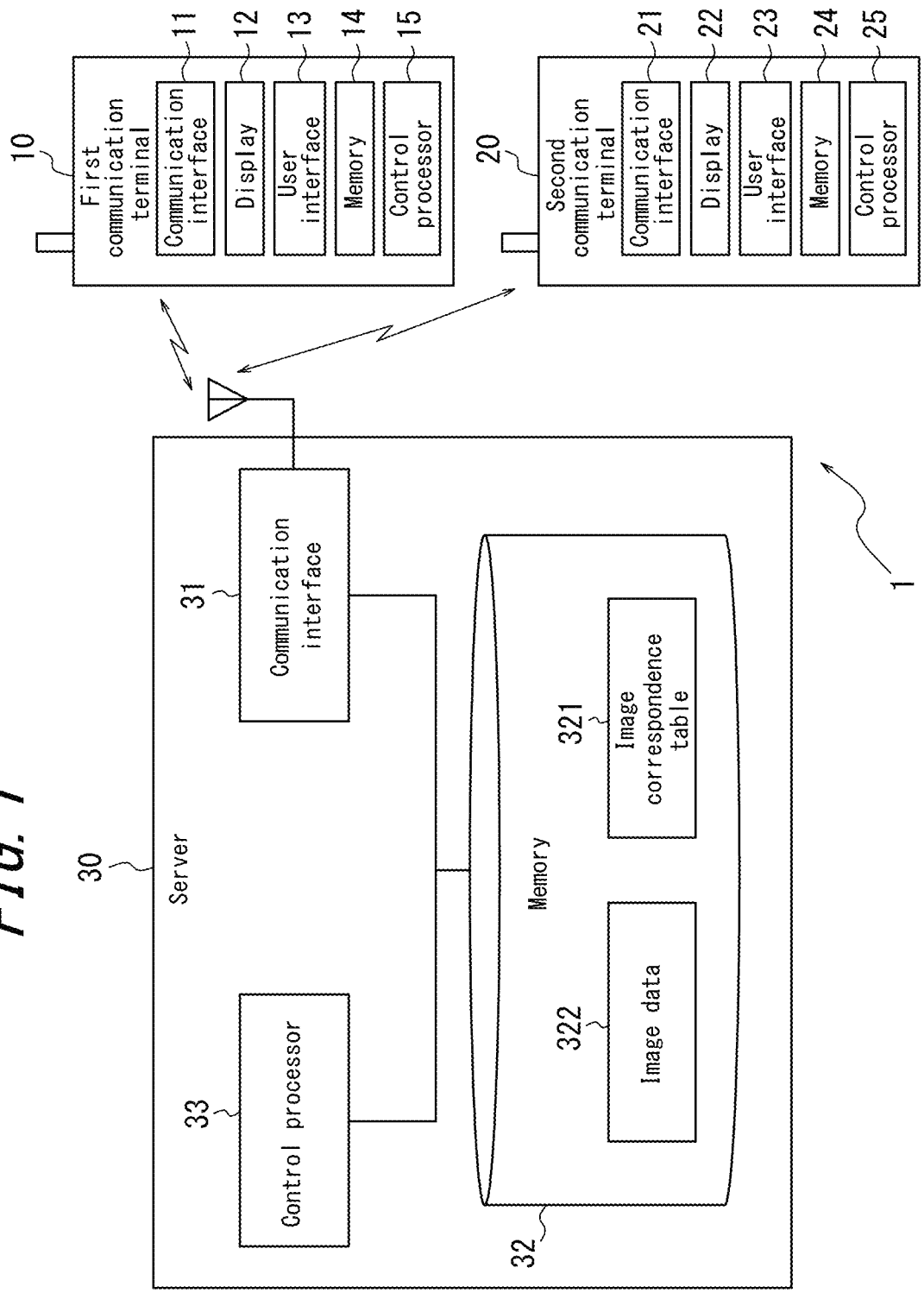
FIG. 1 is a block diagram of a communication system according to Embodiment 1.

FIG. 1 is a block diagram of a communication system according to Embodiment 1. As illustrated in FIG. 1, the communication system 1 according to Embodiment 1 includes a first communication terminal 10, a second communication terminal 20, and a server 30 (message exchange server 30). The server 30 in the communication system 1 provides a function that allows for message exchange between a plurality of communication terminals, such as the first communication terminal 10 and the second communication terminal 20, on which a message exchange application or the like is running. The number of communication terminals included in the communication system 1 is not limited to two and may be any number. As a typical example of communication in the communication system 1, however, the following describes the case of two communication terminals, i.e. the first communication terminal 10 and the second communication terminal 20.

First, the structure of the first communication terminal 10 and the second communication terminal 20 is described.

In the communication system 1, the first communication terminal 10 and the second communication terminal 20 exchange text and images via the server 30 by executing a message exchange application or the like. In particular, when the first communication terminal 10 and the second communication terminal 20 exchange images, first an image is selected on one of the communication terminals by user operation from among images provided by the message exchange application. This communication terminal then transmits a request for image transmission corresponding to the selected image to the server 30. Upon receiving the request for image transmission, the server 30 transmits image data corresponding to the request for image transmission to at least the other communication terminal. Upon receiving the image data, the other communication terminal displays an image that is rendered based on the image data. In this way, in the communication system 1, an image selected by one of the users on one of the communication terminals can be displayed so as to be visible by the other user on the other communication terminal.

The images exchanged between the first communication terminal 10 and the second communication terminal 20 may be any images, such as an illustration of a character appearing in an animated cartoon, a comic book, or the like. A wide variety of forms of these images is conceivable: photographed images; edited versions of photographed images; images not only of people but also of animals, imaginary creatures, or the like; images not only of animate creatures, but also a variety of objects such as vehicles; depictions of letters; and the like. Furthermore, these images may be still images, or for example, short animated videos or the like.

It is assumed that these images are exchanged as one form of message exchange between users of communication terminals, and the exchanged images are preferably images that suggest an emotion or the like of the users transmitting the images. For example, the images preferably express human emotions, such as images of a character in a popular comic book looking happy, sad, angry, apologetic, or the like. Images that convey a message, such as a feeling of gratitude or an apology, are also preferable. When the transmitted image is not an image of a human, animal, or other animate creature, then in order to suggest the emotion or the like of the user transmitting the image, the image may for example be a personification of an object other than an animate creature.

For the sake of convenience, the image selected by the user on the first communication terminal 10 and transmitted to the second communication terminal 20 via the server 30 is referred to below as a "first image". The request for image transmission transmitted from the first communication terminal 10 to the server 30 is referred to as a "first request for image transmission". The image selected by the user on the second communication terminal 20 and transmitted to the first communication terminal 10 via the server 30 is referred to below as a "second image". The request for image transmission transmitted from the second communication terminal 20 to the server 30 is referred to as a "second request for image transmission".

The first communication terminal 10 includes a communication interface 11, display 12, user interface 13, memory 14, and control processor 15. In general, while a message exchange application or the like is running, the first communication terminal 10 transmits text that is input by the user, an image photographed or selected by the user, or the like to another communication terminal, such as the second communication terminal 20, via the server 30. In general, while the message exchange application or the like is running, the first communication terminal 10 also receives, via the server 30, data of text, an image, or the like transmitted from another communication terminal, such as the second communication terminal 20, to the server 30 and displays the received data on the display 12. A configuration may also be adopted so that when the message exchange application is not running on the first communication terminal 10, a notification is displayed on the first communication terminal 10 to indicate that data of text, video, or the like have been transmitted to the first communication terminal 10 from another communication terminal.

The communication interface 11 communicates with the server 30 with a connection that is wireless, wired, or both. Specifically, via control by the control processor 15, the communication interface 11 transmits the first request for image transmission and the like to the server 30. The communication interface 11 also receives image data and the like transmitted from the server 30. The request for image transmission and image data are further described below. In the communication system 1 of this embodiment, when the first communication terminal 10 exchanges messages with another communication terminal, such as the second communication terminal 20, the communication interface 11 transmits and receives, via the server 30, text data of the messages being exchanged with the other communication terminal. In this case, the communication interface 11 transmits a request for text transmission to the server 30 and receives, from the server 30, text data transmitted by the other communication terminal.

The display 12 may be configured using a liquid crystal display, organic EL display, or the like. For example when transmitting an image to the second communication terminal 20, the display 12 displays a plurality of images to prompt the user to select the image to transmit. Upon the first communication terminal 10 receiving image data from the server 30, the display 12 renders an image based on the image data transmitted from the server 30 and displays the image. When the first communication terminal 10 exchanges messages with another communication terminal such as the second communication terminal 20, the display 12 also displays text and the like based on the text data of the messages exchanged with the other communication terminal.

The user interface 13 may be configured by any type of keys or buttons, by a touch panel, or the like. The user interface 13 accepts operation input by the user, for example when exchanging messages with another communication terminal, and detects an input signal generated based on the operation input. The user interface 13 also transmits, to the control processor 15, the input signal detected based on operation input by the user. Specifically, the user interface 13 accepts operation input in which the user selects an image displayed on the display 12 and transmits an input signal indicating selection of the image to the control processor 15. In the case of the user interface 13 being a touch panel, the user interface 13 can accept operation input in which the user touches (or taps) a position corresponding to the area of an image displayed on the display 12 and can transmit an input signal indicating selection of the image to the control processor 15. When the first communication terminal 10 exchanges messages with another communication terminal such as the second communication terminal 20, the user interface 13 can accept operation input that is input by the user, such as characters constituting the text of the message to be exchanged with the other communication terminal.

The memory 14 stores a variety of information necessary for the first communication terminal 10 to exchange messages with another communication terminal, such as the second communication terminal 20, via the server 30. In particular, in this embodiment, when the first communication terminal 10 exchanges messages with another communication terminal 20, via the server 30, the memory 14 stores an application for exchanging text, images, and the like.

The control processor 15 performs a variety of control related to the first communication terminal 10. For example, based on operation input by the user to the user interface 13, the control processor 15 performs control to transmit the first request for image transmission or the like to the server 30 via the communication interface 11. The control processor 15 also performs control to receive, via the communication interface 11, image data transmitted from the server 30. Based on the image data received from the server 30, the control processor 15 performs control to render and display an image at a predetermined position on the display 12. When the first communication terminal 10 exchanges messages with another communication terminal, such as the second communication terminal 20, the control processor 15 performs control to transmit a request for text transmission to the server 30 via the communication interface 11 based on operation input by the user to the user interface 13. The control processor 15 then performs control to receive, via the communication interface 11, text data transmitted from the server 30 and performs control to display text based on the received text data at a predetermined position on the display 12.

The second communication terminal 20 includes a communication interface 21, display 22, user interface 23, memory 24, and control processor 25. In general, while a message exchange application or the like is running, the second communication terminal 20 transmits text that is input by the user, an image photographed or selected by the user, or the like to another communication terminal, such as the first communication terminal 10, via the server 30. In general, while the message exchange application or the like is running, the second communication terminal 20 also receives, via the server 30, data of text, an image, or the like transmitted from another communication terminal, such as the first communication terminal 10, to the server 30 and displays the received data on the display 22. A configuration may also be adopted so that when the message exchange application is not running on the second communication terminal 20, a notification is displayed on the second communication terminal 20 to indicate that data of text, video, or the like have been transmitted to the second communication terminal 20 from another communication terminal.

The functional components of the second communication terminal 20 may have a similar structure as the above-described communication interface 11, display 12, user interface 13, memory 14, and control processor 15 of the first communication terminal 10. Hence, a detailed explanation of these components is omitted.

Next, the information stored by the memories 14 and 24 in order for the first communication terminal 10 and the second communication terminal 20 to exchange images is further described.

The memory 14 of the first communication terminal 10 stores each association between a first image selected on the first communication terminal 10 and the first request for image transmission to be transmitted from the first communication terminal 10 to the server 30 in correspondence with the first image. The memory 24 of the second communication terminal 20 stores each association between a second image selected on the second communication terminal 20 and the second request for image transmission to be transmitted from the second communication terminal 20 to the server 30 in correspondence with the second image.

FIGS. 2A and 2B illustrate examples of the content of tables stored in the memories 14 and 24. FIG. 2A illustrates a fictitious example of associations, in the memory 14, between first images selected on the first communication terminal 10 and first requests for image transmission corresponding to these first images. FIG. 2B illustrates a fictitious example of associations, in the memory 24, between second images selected on the second communication terminal 20 and second requests for image transmission corresponding to these second images. In FIGS. 2A and 2B, the first images A1 to An and the second images B1 to Bn may, as described above, each be an image of a character expressing the user's emotion or the like. Accordingly, for example image A1 is actually an image of an illustration or the like, and this image is referred to as A1 for the sake of convenience.

The first image and the second image may be considered to be images transmittable from the first communication terminal 10 or the second communication terminal 20 to another communication terminal, with image data for these images being stored in advance in the memories 14 and 24. For example, on the first communication terminal 10, if the first image, for example, is downloaded and stored in the memory 14, then the first image can be transmitted to another communication terminal. On the other hand, images that are not downloaded on the first communication terminal 10 and are not stored in the memory 14 may be considered images that cannot be transmitted to another communication terminal. As illustrated in FIGS. 2A and 2B, for example the first images A1 to An that are downloaded on the first communication terminal 10 and stored in the memory 14 can be transmitted to another communication terminal, yet other images may be considered not to be transmittable to another communication terminal.

When thus allowing for the transmission of an image downloaded onto a certain communication terminal to another communication terminal, for example downloading of the image is preferably allowed by a predetermined condition being satisfied on the other communication terminal. The predetermined condition to be satisfied on the other communication terminal may, for example, be that the same application as the application on the certain communication terminal (the terminal that transmits the image) is downloaded onto the other communication terminal (the terminal that is the communication partner).

Instead of actual image data, the first image and the second image may be registered in the memories 14 and 24 as information indicating that the images can be transmitted from the first communication terminal 10 or the second communication terminal 20 (for example, information on authority for use). In other words, on the first communication terminal 10, for example information indicating that the first image can be transmitted to another communication terminal (information on authority for use of the image) may be registered in the memory 14. In this case, on the first communication terminal 10, an image for which information on authority for use is not registered in the memory 14 cannot be transmitted to another communication terminal. In this case, as illustrated in FIG. 2A, for example in the first communication terminal 10, the first images A1 to An for which authority for use is registered in the memory 14 can be transmitted to another communication terminal, whereas other images cannot be transmitted to another communication terminal.

In this way, on the first communication terminal 10 or the second communication terminal 20, the images that can be transmitted to the other communication terminal may be restricted to certain images. Accordingly, in addition to images for which an indication of permission for use is registered in advance in the memories 14 and 24, the user is preferably allowed to obtain authority for use of various types of images from, for example, Internet sites or the like. In this way, for example by obtaining more first images, the user of the first communication terminal 10 can transmit a greater variety of images to the user of another communication terminal.

As described above, the data for displaying the first images and the second images (image data) may be stored in the memories of the first communication terminal 10 and second communication terminal 20, or such image data may be stored by the server 30. By the server 30 thus storing image data of the first images and the second images, it suffices for the first communication terminal 10 and the second communication terminal 20 to transmit, to the server 30, only a request for image transmission that identifies the image data to be transmitted to the other terminal. Therefore, in this case, the first communication terminal 10 and the second communication terminal 20 do not need to transmit, to the server 30, the actual image data to be transmitted to the other terminal. The following describes a configuration in which, in the communication system 1, the server 30 stores image data of the first images and the second images.

Even in the case that the server 30 stores image data, and image data are not included in the first or second request for image transmission, for the sake of convenience, expressions such as "transmit an image" from the communication terminal to another communication terminal via the server are used in this disclosure.

As illustrated in FIG. 2A, in the memory 14 of the first communication terminal 10, first requests for image transmission A1r to Anr transmitted to the server 30 are associated with first images A1 to An selected by the user of the first communication terminal 10. Similarly, as illustrated in FIG. 2B, in the memory 24 of the second communication terminal 20, second requests for image transmission B1r to Bnr transmitted to the server 30 are associated with second images B1 to Bn selected by the user of the second communication terminal 20. By storing such an association table, the first communication terminal 10 and the second communication terminal 20 can identify the request for image transmission corresponding to the selected image and transmit the request for image transmission to the server 30.

For example, upon the user selecting the first image A1 on the first communication terminal 10, the control processor 15 performs control to transmit the first request for image transmission A1r corresponding to the first image A1 to the server 30 via the communication interface 11. When prompting the user to select the first image on the first communication terminal 10, the plurality of first images are preferably displayed so as to make it easy for the user to select one. For example, the plurality of first images may be displayed by listing the names of the first images as character strings on the display 12, by displaying reductions of the first images, such as thumbnails, or by displaying the first images at actual size or enlarged. After thus displaying the first images on the display 12 to allow for selection, the first communication terminal 10 accepts input in which the user selects the first image by operating the user interface 13. For example, upon the user selecting the second image B3 on the second communication terminal 20, the control processor 25 performs control to transmit the second request for image transmission B3r corresponding to the second image B3 to the server 30 via the communication interface 21.

Next, the structure of the server 30 is described.

As illustrated in FIG. 1, the server 30 includes a communication interface 31, memory 32, and control processor 33. In general, the server 30 receives requests for image transmission and the like from communication terminals such as the first communication terminal 10 and the second communication terminal 20. In general, the server 30 also transmits image data corresponding to the received requests for image transmission to communication terminals such as the first communication terminal 10 and the second communication terminal 20. In the communication system 1, when the first communication terminal 10 or the second communication terminal 20 exchanges messages with another communication terminal, in general, the server 30 receives requests for text transmission from a communication terminal such as the first communication terminal 10 or the second communication terminal 20. In this case, the server 30 transmits text data corresponding to the received requests for text transmission to a communication terminal such as the first communication terminal 10 and the second communication terminal 20.

The communication interface 31 communicates with the first communication terminal 10 and the second communication terminal 20 with a connection that is wireless, wired, or both. Specifically, in this embodiment, via control by the control processor 33, the communication interface 31 receives the first or second request for image transmission transmitted from the first communication terminal 10 or the second communication terminal 20. Furthermore, via control by the control processor 33, the communication interface 31 reads image data corresponding to the received request for image transmission from the memory 32 and transmits the image data to either or both of the first communication terminal 10 and the second communication terminal 20. The communication interface 31 preferably transmits image data corresponding to the received request for image transmission to both the first communication terminal 10 and the second communication terminal 20. Furthermore, as described below, via control by the control processor 33, the communication interface 31 in this embodiment transmits image data (third image data) corresponding to a combination of received requests for image transmission to the first communication terminal 10 and the second communication terminal 20 in a predetermined case.

The memory 32 stores a variety of information necessary for the server 30 to provide a function allowing communication terminals such as the first communication terminal 10 and the second communication terminal 20 to exchange messages.

In particular, in this embodiment, the memory 32 stores the correspondence relationships between requests for image transmission and image data so that, when the first or second request for image transmission is received, the image data that are to be transmitted in response to the request for image transmission can be identified. The area, in the memory 32, for storing such correspondence relationships between the requests for image transmission and the image data is, for the sake of convenience, referred to as an image correspondence table 321.

In this embodiment, the memory 32 also stores various types of image data transmitted from the server 30 to the first communication terminal 10 or the second communication terminal 20 in response to a request for image transmission. The area, in the memory 32, for storing such image data is, for the sake of convenience, referred to as image data 322.

FIG. 3 illustrates a fictitious example of information stored as the image correspondence table 321 in the memory 32. As illustrated in FIG. 3, the image correspondence table 321 stores each association between a request for image transmission received by the server 30 from the first communication terminal 10 or the second communication terminal 20 and the image data to be transmitted by the server 30 to the communication terminal upon receipt of the request for image transmission.

For the sake of convenience, the image data that the server 30 transmits to at least the second communication terminal 20 in response to the first request for image transmission transmitted to the server 30 from the first communication terminal 10 are referred to as "first image data". Furthermore, the image data that the server 30 transmits to at least the first communication terminal 10 in response to the second request for image transmission transmitted to the server 30 from the second communication terminal 20 are referred to as "second image data".

For example, upon receiving the first request for image transmission A1r from the first communication terminal 10, the server 30 transmits the image data A1d corresponding to the first request for image transmission A1r to at least the second communication terminal 20 as the first image data. Furthermore, for example upon receiving the first request for image transmission A2r from the first communication terminal 10, the server 30 transmits the image data A2d corresponding to the first request for image transmission A2r to at least the second communication terminal 20 as the first image data. For example upon receiving the second request for image transmission B3r from the second communication terminal 20, the server 30 transmits the image data B3d corresponding to the second request for image transmission B3r to at least the first communication terminal 10 as the second image data.

Figure 4:
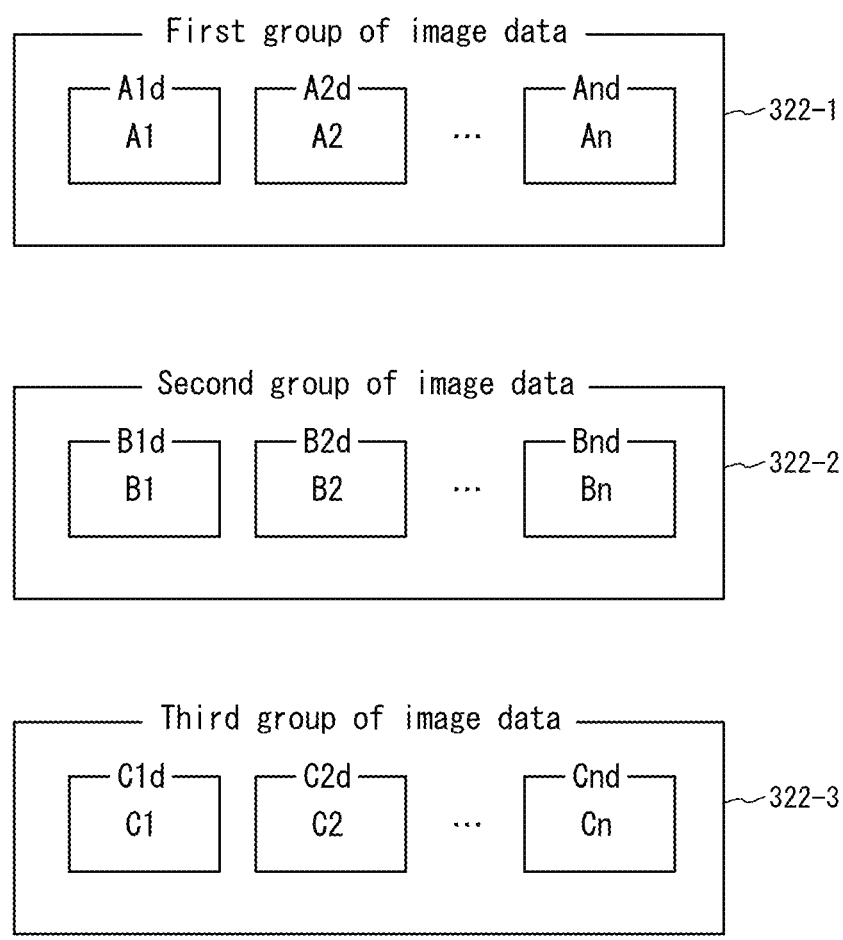
FIG. 4 illustrates an example of image data stored in the memory of the server.

FIG. 4 illustrates a fictitious example of information stored as the image data 322 in the memory 32. As illustrated in FIG. 4, among the image data 322, the image data belonging to each group of image data are stored with a filename for identifying the image data. For example, in FIG. 4, the image data A1d belonging to the first group of image data 322-1 can for example be treated as image data with the filename A1d, indicating that the image A1 is displayed by rendering an image based on the image data A1d.

In FIG. 4, the first group of image data 322-1 forms a collection of candidates for the first image data to transmit to at least the second communication terminal 20 when the server 30 receives the first request for image transmission from the first communication terminal 10. In other words, the first communication terminal 10 can, based on user selection, transmit any image data among the first image data A1d, A2d, . . . , And stored in the first group of image data 322-1 to the second communication terminal 20 via the server 30. Similarly, the second communication terminal 20 can, based on user selection, transmit any image data among the second image data B1d, B2d, . . . , Bnd stored in the second group of image data 322-2 to the first communication terminal 10 via the server 30.

In this way, by storing the image correspondence table 321 and the image data 322 in the memory 32, the server 30 can, when receiving a request for image transmission from a communication terminal, read the image data corresponding to the request and transmit the image data to a communication terminal. The second communication terminal 20 can then receive the first image data corresponding to the first request for image transmission from the server 30 and display the first image based on the first image data on the display 22. The first communication terminal 10 can also receive the second image data corresponding to the second request for image transmission from the server 30 and display the second image based on the second image data on the display 12.

In this embodiment, when the first request for image transmission and the second request for image transmission are a predetermined combination, the server 30 transmits third image data corresponding to the predetermined combination to the first communication terminal 10 and the second communication terminal 20. In other words, in the communication system 1 of this embodiment, when the first image transmitted by the first communication terminal 10 to the second communication terminal 20 and the second image transmitted by the second communication terminal 20 to the first communication terminal 10 are a predetermined combination, another image is transmitted to these communication terminals.

In the image correspondence table 321 described with reference to FIG. 3, the third image data at the right end indicate third image data that the server 30 transmits when the first request for image transmission and the second request for image transmission are a predetermined combination, as described above. In FIG. 3, the first request for image transmission and second request for image transmission located on the same line form a predetermined combination, and the third image data also located on the same line are the third image data corresponding to this combination. On the other hand, in FIG. 3, a first request for image transmission and a second request for image transmission not located on the same line do not form a predetermined combination, and in this case, there are no third image data.

For example, as illustrated in FIG. 3, when the server 30 receives the first request for image transmission A1r from the first communication terminal 10 and then receives the second request for image transmission B1r from the second communication terminal 20, the server 30 transmits the third image data C1d to the first communication terminal 10 and the second communication terminal 20. When the server 30 receives the first request for image transmission A3r from the first communication terminal 10 and then receives the second request for image transmission B3r from the second communication terminal 20, the server 30 transmits the third image data C3d to the first communication terminal 10 and the second communication terminal 20. On the other hand, when the server 30 receives the first request for image transmission A1r from the first communication terminal 10 and then receives the second request for image transmission B3r from the second communication terminal 20, the server 30 does not transmit third image data.

In the image data 322 described in FIG. 4, the third group of image data 322-3 forms a collection of candidates for the above-described third image data. As illustrated in FIG. 4, among the image data 322, each set of image data belonging to the third group of image data is stored with a filename for identifying the image data in correspondence with a predetermined combination of the first request for image transmission and the second request for image transmission. For example, in FIG. 4, the image data C2d belonging to the third group of image data 322-3 can for example be treated as image data with the filename C2d, indicating that the image C2 is displayed by rendering an image based on the image data C2d. In this way, the image that is rendered based on the third image data is referred to as the "third image".

The third image is preferably set to be an image that continues along with the above-described first image and second image and suggests some sort of cause-and-effect relationship between the first image and the second image. For example, suppose that when the first image is an illustration of a character handing someone some sort of present, the second image is an illustration of another character receiving the present. In this case, the third image may be an illustration of both the character handing over the present and the character receiving the present, with both characters expressing joy together. Further suppose that, for example, when the first image is an illustration of a character handing someone some sort of present, the second image is an illustration of another character refusing the present. In this case, the third image may be an illustration of the receiving character refusing the present, with the character who tried to give the present looking sad. Furthermore, for example when the first image is an illustration of a character handing someone some sort of present, and the second image is a completely unrelated illustration, the third image is not shown.

In this way, in this embodiment, when a second image is transmitted from the second communication terminal 20 in response to the first image transmitted from the first communication terminal 10, an image transmitted by neither the first communication terminal 10 nor the second communication terminal 20 can be further received. Hence, in the communication system 1 according to this embodiment, image exchange not only allows for a mere unilateral expression of the users' emotions, but can also add elements of entertainment and surprise to what unfolds after image exchange. The communication system 1 according to this embodiment can therefore be expected to stimulate the users' interest and further increase the users' motivation to exchange messages.

Next, the communication sequence in the communication system 1 is described along with a specific example of image display.

FIG. 5 is a representative example of a communication sequence in the communication system 1. FIGS. 6A to 8 illustrate examples of images displayed on the display 12 in the first communication terminal 10 and the display 22 in the second communication terminal 20. The following describes an example in which the first communication terminal 10 first transmits an image to the second communication terminal 20, and the second communication terminal 20 transmits an image in response to the first communication terminal 10. In FIGS. 6A to 8, the user of the first communication terminal 10 is named mai, and the user of the second communication terminal is named taro.

When exchanging images in the communication system 1, first, as illustrated in FIG. 5, the first communication terminal 10 accepts operation input selecting an image that the user mai wishes to transmit to her communication partner taro (second communication terminal 20) (step S11).

In this case, as illustrated in FIG. 6A, the display 12 of the first communication terminal 10 preferably displays a screen for selecting an image to transmit to the second communication terminal 20 and prompts the user to select an image to transmit. The drawing to the left side in FIG. 6A represents a screen displaying a window for selecting a transmission image at the top part of the display 12 (image selection window) and prompting the user to select one of images (1) to (6). In this drawing, only image (5) is illustrated, yet different images (1) to (6) are actually displayed. When there are more than six images to be displayed in the image selection window, a measure may be taken such as allowing the user to scroll the images displayed in the window to change to another image. On such a screen, the user is allowed to select the image to transmit to the second communication terminal 20 by, for example, operating a key or button or by touching (tapping) the touch panel. At this point in time, it is assumed that no image is being displayed on the display 22 of the second communication terminal 20, as illustrated in the drawing at the right side in FIG. 6A.

Once the operation input to select the image to be transmitted is complete in step S11, the first communication terminal 10 transmits the first request for image transmission corresponding to the selected image to the server 30 (step S12).

Upon receiving the first request for image transmission transmitted from the first communication terminal 10 in step S12, the server 30 transmits the first image data corresponding to the first request for image transmission to at least the second communication terminal 20 (step S13 to step S14).

Upon receiving the first image data transmitted from the server 30 in step S13 to step S14, the second communication terminal 20 displays the first image on the display 22 based on the first image data (step S15). As a result, as illustrated in the drawing on the right side of FIG. 6B, the first image transmitted by the first communication terminal 10 is displayed on the display 22 of the second communication terminal 20.

As described above, when transmitting the first image data in step S13, the server 30 preferably transmits the first image data not only to the second communication terminal 20 (step S14), but also to the first communication terminal 10 (step S13 to step S16). In this way, on the first communication terminal 10 as well, the same image that was transmitted to the second communication terminal 20 can be displayed on the display 12 (step S17). As a result, as illustrated in the drawing on the left side of FIG. 6B, the first image that mai herself transmitted is displayed on the display 12 of the first communication terminal 10. When the memory 14 of the first communication terminal 10 stores the first image data corresponding to the first request for image transmission transmitted from the first communication terminal 10, the first communication terminal 10 can perform the operation in step S17 without passing through step S16.

For the sake of convenience, the above steps S11 through S17 are referred to as the first sequence. In the example illustrated in FIGS. 6A and 6B, in the first sequence, an image in which a character is asking for a hug is transmitted from the first communication terminal 10 to the second communication terminal 20 and displayed on the second communication terminal 20. As illustrated in FIGS. 6A and 6B, the image that mai herself transmitted is displayed as a history on the first communication terminal 10.

When displaying the exchanged images on the displays 12 and 22, the images transmitted from the communication partner are preferably displayed in an area always on the same side (for example, the left side of the screen), and the images that users themselves transmit are also preferably displayed in an area always on the same side (for example, the right side of the screen). Thus displaying images that users themselves have transmitted and images received from someone else in separate areas allows for a user-friendly screen configuration that will not confuse the user.

The following describes the case in which the user of the second communication terminal 20, who has seen the image transmitted from the server 30 by the first communication terminal 10, returns a second image in response to the transmitted first image.

As illustrated in FIG. 5, the second communication terminal 20 accepts operation input to select an image that the user taro wants to transmit to his communication partner mai (first communication terminal 10) (step S21).

Figure 7A:
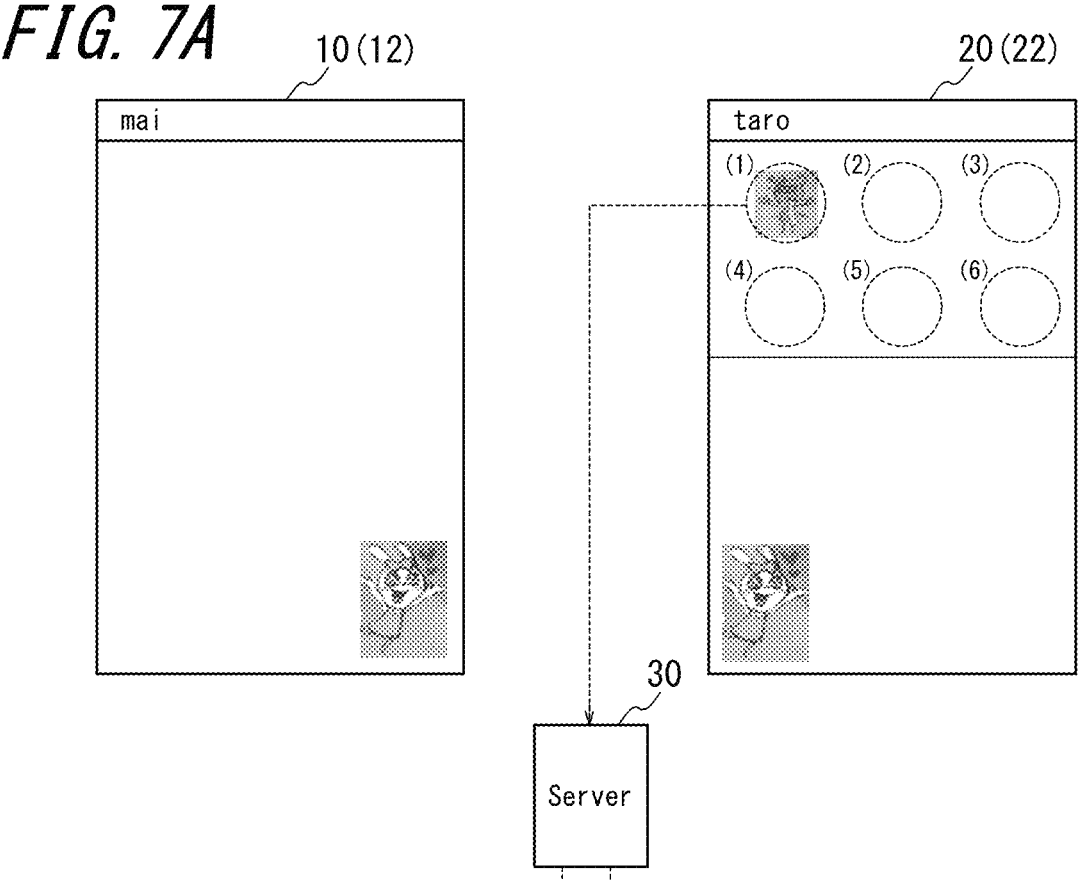
FIGS. 7A and 7B illustrate an example of a second image displayed on a display of the communication terminal.

In this case, as illustrated in FIG. 7A, the display 22 of the second communication terminal 20 preferably displays a screen for selecting an image to transmit to the first communication terminal 10 and prompts the user to select an image to transmit. The drawing to the right side in FIG. 7A represents a screen displaying an image selection window at the top part of the display 22 and prompting the user to select one of images (1) to (6). In this drawing, only image (1) is illustrated, yet different images (1) to (6) are actually displayed. On such a screen, the user is allowed to select the image to transmit to the first communication terminal 10 by, for example, operating a key or button or by touching (tapping) the touch panel. At this point in time, it is assumed that the image that mai just transmitted is being displayed on the display 12 of the first communication terminal 10, as illustrated in the drawing at the left side in FIG. 7A.

Once the operation input to select the image to be transmitted is complete in step S21, the second communication terminal 20 transmits the second request for image transmission corresponding to the selected image to the server 30 (step S22).

Upon receiving the second request for image transmission transmitted from the second communication terminal 20 in step S22, the server 30 transmits the second image data corresponding to the second request for image transmission to at least the first communication terminal 10 (step S23 to step S24).

Upon receiving the second image data transmitted from the server 30 in step S23 to step S24, the first communication terminal 10 displays the second image on the display 12 based on the second image data (step S25). As a result, as illustrated in the drawing on the left side of FIG. 7B, the second image transmitted by the second communication terminal 20 is displayed on the display 12 of the first communication terminal 10.

Figure 7B:
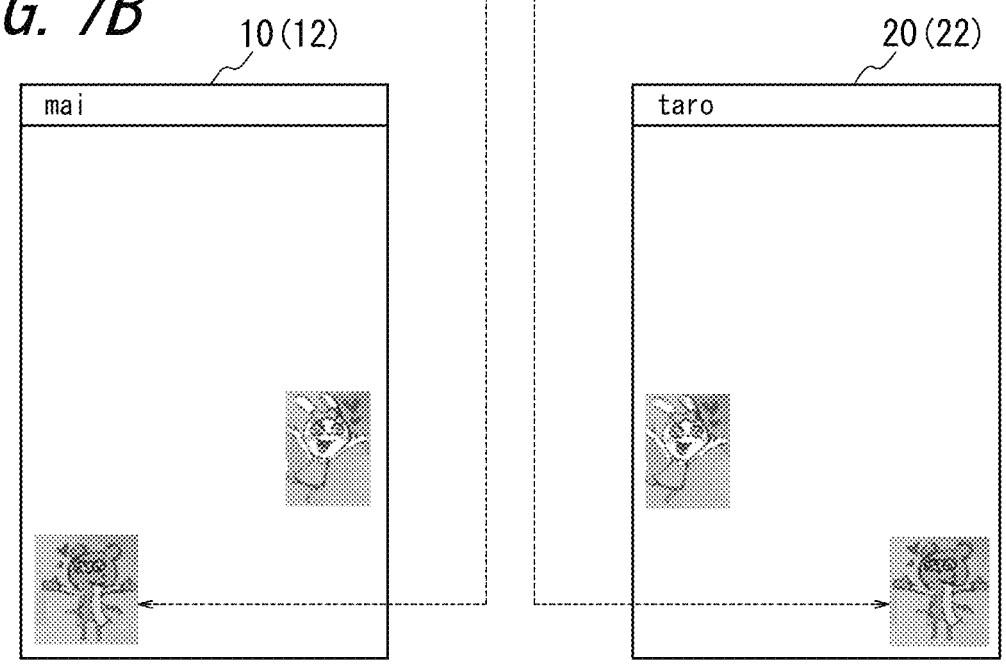

As described above, when transmitting the second image data in step S23, the server 30 preferably transmits the second image data not only to the first communication terminal 10 (step S24), but also to the second communication terminal 20 (step S23 to step S26). In this way, on the second communication terminal 20 as well, the same image that was transmitted to the first communication terminal 10 can be displayed on the display 22 (step S27). As a result, as illustrated in the drawing on the right side of FIG. 7B, the second image that taro himself transmitted is displayed on the display 22 of the second communication terminal 20. When the memory 24 of the second communication terminal 20 stores the second image data corresponding to the second request for image transmission transmitted from the second communication terminal 20, the second communication terminal 20 can perform the operation in step S27 without passing through step S26. In order to make the history of image exchange more easily viewable on the communication terminal, the display of the first image is preferably scrolled upward on the displays 12 and 22 to further display the second image, as illustrated in FIG. 7B.

For the sake of convenience, the above steps S21 through S27 are referred to as the second sequence. In the example illustrated in FIGS. 7A and 7B, in the second sequence, an image in which another character responds to the first character's hug is transmitted from the second communication terminal 20 to the first communication terminal 10 and displayed on the first communication terminal 10. As illustrated in FIGS. 7A and 7B, the image that taro himself transmitted is displayed as a history on the second communication terminal 20.

Next, when the first request for image transmission from the first communication terminal 10 (step S12) and the second request for image transmission from the second communication terminal 20 (step S22) are a predetermined combination, the server 30 transmits third image data corresponding to the combination (step S31). In step S31, the server 30 transmits third image data corresponding to the predetermined combination to the first communication terminal 10 (step S32) and the second communication terminal 20 (step S34).

Figure 8:
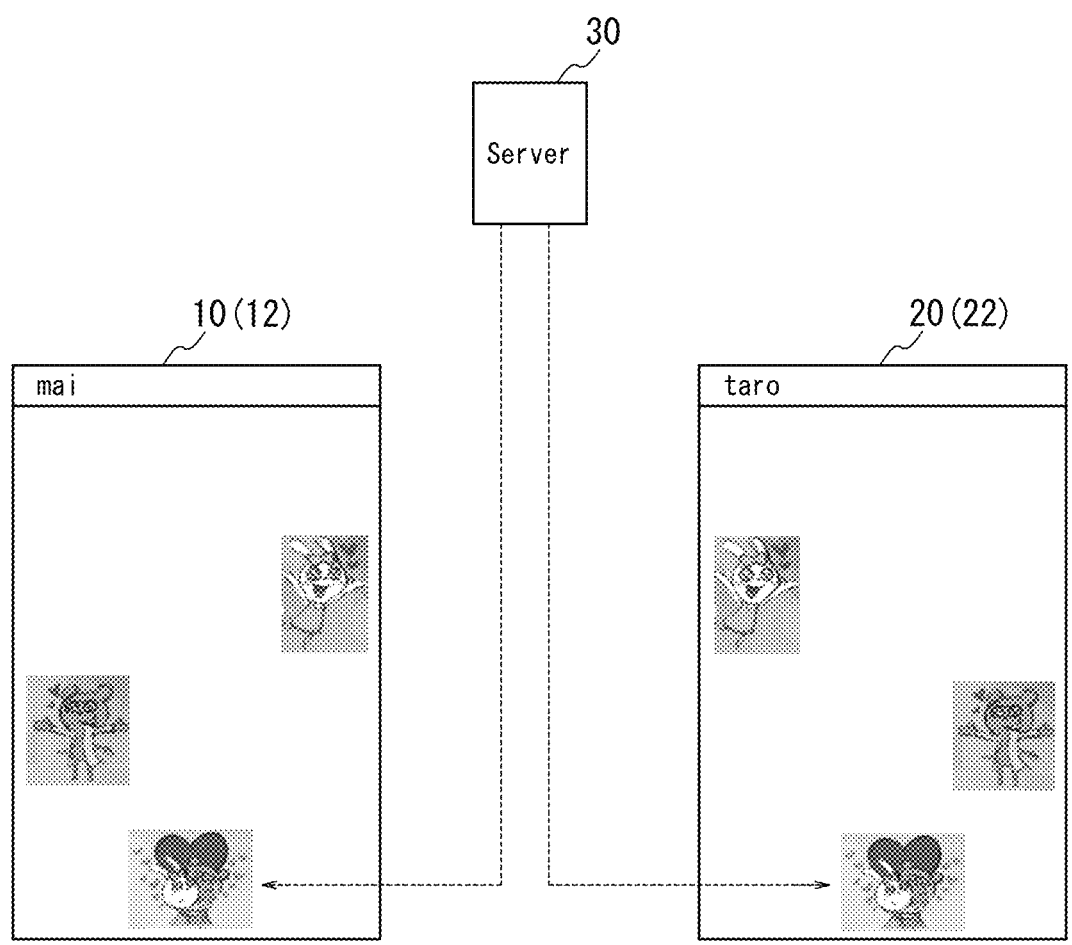
FIG. 8 illustrates an example of a third image displayed on a display of the communication terminal.

Upon receiving the third image data transmitted from the server 30 in step S32, the first communication terminal 10 displays the third image on the display 12 based on the third image data (step S33). Upon receiving the third image data transmitted from the server 30 in step S34, the second communication terminal 20 also displays the third image on the display 22 based on the third image data (step S35). As a result, as illustrated in FIG. 8, the third image transmitted from the server 30 is displayed on the display 12 of the first communication terminal 10 and the display 22 of the second communication terminal 20.

For the sake of convenience, the above steps S31 through S35 are referred to as the third sequence. In the first sequence, an image in which a character is asking for a hug is displayed as the first image, and in the second sequence, an image in which another character responds to the hug is displayed as the second image. Therefore, in the example illustrated in FIG. 8, as the third sequence, an image in which both of the characters look happy is transmitted to both the first communication terminal 10 and the second communication terminal 20 and displayed.

When thus displaying the third image on the displays 12 and 22, the third image is preferably displayed in a different area (such as the lower central area of the screen) than the areas in which the image transmitted from the communication partner (for example, the left side of the screen) and the image transmitted by the user (for example, the right side of the screen) are displayed. Thus displaying the third image in a separate area from the images that users themselves have transmitted and the images received from someone else allows for a user-friendly screen configuration that will not confuse the user.

In this way, in this embodiment, upon receiving the first request for image transmission and the second request for image transmission, if these requests for image transmission are a predetermined combination, the server 30 preferably transmits third image data corresponding to the predetermined combination. When transmitting the third image data to the first communication terminal 10 and the second communication terminal 20, the server 30 preferably transmits the third image data after transmitting the first image data to the second communication terminal 20 and transmitting the second image data to the first communication terminal 10.

In the above-described example, upon receiving the second request for image transmission after the first request for image transmission, the server 30 transmits the third image data in a predetermined case. The server 30 may, however, similarly transmit the third image data in a predetermined case not only when receiving the second request for image transmission after the first request for image transmission, but also when receiving the first request for image transmission after the second request for image transmission.

Alternatively, when receiving the first request for image transmission after the second request for image transmission, the server 30 may be configured not to transmit the third image data, or to transmit different third image data, even when the requests for image transmission are a predetermined combination. For example, when the second request for image transmission associated with the first request for image transmission is not received, the server 30 may transmit third image data indicating that the communication partner did not return an image corresponding to the image that the user transmitted. In this case, in the image correspondence table 321 described with reference to FIG. 3, third image data are associated or not associated, or different third image data are associated, in accordance with the order in which the server 30 receives requests for image transmission, even for the same predetermined combination. Furthermore, in the image data 322 described with reference to FIG. 4 as well, different third image data are stored in accordance with the order in which the server 30 receives the requests for image transmission.

In this embodiment, the user is preferably not allowed to acquire the right to use the third image data. With this approach, the user of the communication terminal can only view the third image by exchanging images, thereby further increasing the user's motivation to use the communication system 1 of this embodiment. The right for the first communication terminal 10 and the second communication terminal 20 to use the third images that have been displayed once on the first communication terminal 10 and the second communication terminal 20 may be registered on the server 30. With this approach, a third image that has appeared once can subsequently be used freely, which can be expected to further increase the user's motivation to use the communication system 1 of this embodiment.

In this embodiment, a variety of conditions for identifying the third image data that the server 30 transmits may be envisioned.

For instance, in the example described with reference to FIG. 3, when the first request for image transmission and the second request for image transmission are a predetermined combination, the server 30 transmits third image data corresponding to the predetermined combination. In other words, based on the combination of the first request for image transmission and the second request for image transmission, the third image data are identified. As illustrated in FIG. 3, however, since the request for image transmission and the image data are associated, the third image data may be identified based on the combination of the first image data and the second image data. In other words, when the first request for image transmission and the second request for image transmission are a predetermined combination, the server 30 may determine the third image data based on the combination of the first image data and the second image data.

The group of image data described with reference to FIG. 4 may also be a collection of image data related to characters appearing in a particular animated cartoon, comic book, or the like. In this case, when the first image data corresponding to the first request for image transmission and the second image data corresponding to the second request for image transmission are characters appearing in the same comic book or the like, or are corresponding (related) characters, the server 30 transmits the third image.

In this case, as the first group of image data, the server 30 stores the group of image data to which the first image data corresponding to the first request for image transmission belong, and as the second group of image data, the server 30 stores the group of image data to which the second image data corresponding to the second request for image transmission belong. The server 30 then transmits the third image data when the first group of image data, to which the first image data corresponding to the first request for image transmission belong, and the second group of image data, to which the second image data corresponding to the second request for image transmission belong, are the same group of image data or are corresponding groups of image data. The third image data transmitted in this case are preferably image data determined based on the combination of the first image data and the second image data.

Furthermore, the first request for image transmission and the second request for image transmission need not be associated one-to-one with the corresponding third image data. In other words, it suffices to uniquely identify the corresponding third image data based on the combination of the first request for image transmission and the second request for image transmission.

Therefore, for example as illustrated in FIG. 9, a tag that can be a keyword or the like may be associated with each of a plurality of sets of image data included in the first group of image data to which the first image data belong. In the image correspondence table 321-1 illustrated in FIG. 9, a tag is associated with each set of first image data. Furthermore, in the image correspondence table 321-2, a tag is associated with each set of second image data, and in the image correspondence table 321-3, a tag is associated with each set of third image data. Based on such tags, the corresponding third image data can be transmitted when the tag associated with the first image data corresponding to the first request for image transmission is identical or corresponds to the tag associated with the second image data corresponding to the second request for image transmission.

For example, as illustrated in FIG. 9, the tag T1 is attached to the first image data A1*d* corresponding to the first request for image transmission, and the tag T5 is attached to the second image data B1*d* corresponding to the second request for image transmission. Therefore, in this case, the server 30 does not transmit the third image data. On the other hand, if the first image data corresponding to the first request for image transmission is A1*d* and the second image data corresponding to the second request for image transmission is B2*d*, then since the tag for both sets of image data is T1, the server 30 may be configured to transmit the third image data C1*d* in this case.

Furthermore, in the example illustrated in FIG. 9, the tags are merely symbols, yet these tags may be keywords such as "happy", "fun", "sad", "uneasy", or the like. When managing such tags as keywords, the corresponding third image data may be transmitted not only when the tags attached to the image data corresponding to the first and second requests for image transmission match, but also when the tags are related, such as "happy" and "fun".

When using tags in this way, the server 30 associates a tag with each set of image data included in the first group of image data to which the first image data belong. Similarly, the server 30 associates a tag with each set of image data included in the second group of image data to which the second image data belong. The server 30 then transmits the third image data when the tag associated with the first image data corresponding to the first request for image transmission is identical or corresponds to the tag associated with the second image data corresponding to the second request for image transmission. The third image data that are transmitted in this case are preferably image data corresponding to the identical or corresponding tags. With this approach, the elements of entertainment and surprise during image exchange can be increased.

In the example illustrated in FIG. 9, only one tag is associated with each set of image data A1*d*, B1*d*, and so on, yet for example a plurality of tags may be associated with the second image data. For example, the tag T1 may be associated with the first image data A1*d* in the table 321-1 illustrated in FIG. 9, and the tags T4 and T1 may be associated with the second image data B3*d* in the table 321-2 illustrated in FIG. 9. In such circumstances, when a second request for image transmission corresponding to either image data B2d or B3d is transmitted in response to the first image data A1d, the server 30 transmits the third image data C1d corresponding to the tag T1.

Embodiment 2

Next, a communication system according to Embodiment 2 of this disclosure is described.

In Embodiment 2, the third image that is displayed is varied by associating an element of time with the image exchange in Embodiment 1.

For example, if the time interval from when the server 30 receives the first request for image transmission to when the server 30 receives the second request for image transmission is relatively long, it may be assumed that a reasonable length of time has elapsed from when the user transmitted the first request for image transmission until the user that is the communication partner transmitted the second request for image transmission. In such a case, considering how the users that are exchanging images have started to lose interest in the image exchange, a configuration may be adopted so as not to transmit the third image data when the interval between transmission of the first and the second requests for image transmission exceeds a predetermined length of time. Conversely, if the time interval from when the server 30 receives the first request for image transmission to when the server 30 receives the second request for image transmission is relatively short, it may be assumed that immediately after the user transmitted the first request for image transmission, the user that is the communication partner transmitted the second request for image transmission. In this case, for example as an incentive for the communication partner to respond quickly to image exchange, different third image data may be transmitted in accordance with the interval between the transmission of the first and second requests for image transmission.

In this case, the server 30 transmits the third image data when (i) the first request for image transmission and the second request for image transmission are a predetermined combination, and (ii) the interval between receipt of the first request for image transmission and receipt of the second request for image transmission is within a predetermined length of time. The server 30 may also transmit different third image data in accordance with the time interval between receipt of the first request for image transmission and receipt of the second request for image transmission. When implementing this embodiment, the server 30 needs to store, in the memory 32, associations between different third image data and the corresponding interval from receipt of the first request for image transmission until receipt of the second request for image transmission.

With this approach, even if users exchange the same image, the third image differs in accordance with the time interval of the exchange. Therefore, the effect of maintaining user interest in image exchange can be expected. Hence, a further increase in the user's motivation to use the communication system of Embodiment 2 can be expected.

On the other hand, for example even if the time interval from when the server 30 receives the first request for image transmission to when the server 30 receives the second request for image transmission is relatively long, it may be the case that the other user was temporarily unable to receive the first image data due to a network problem or the like. In such a case, the other user might have transmitted the second request for image transmission immediately after seeing the first image.

Some applications for message exchange allow the transmitting user to confirm information on whether the communication partner has viewed a transmitted message. For example, during message exchange such as chat, when a transmitted message has been displayed on the (receiving side) communication terminal of the communication partner, the word "read", a mark indicating that the message has been read, or the like is displayed on the display in the (transmitting side) communication terminal of the user.

Therefore, in Embodiment 2, the starting time for the above-described time interval may be the point in time, after the server 30 transmits the first image to the second communication terminal 20, at which a read message notification or other such information indicating that the first image has been displayed is received from the second communication terminal 20. In this case, the server 30 transmits the third image data when the interval between the time of receipt from the second communication terminal 20 of a notification indicating that the first image based on the first image data has been displayed (for example, a read message notification or the like) and the time of receipt of the second request for image transmission is within a predetermined length of time.

With this approach, the communication partner can indirectly be encouraged to return an image promptly in response to the transmitted image. Hence, a further increase in the user's motivation to use the communication system of Embodiment 2 can be expected.

Embodiment 3

Next, a communication system according to Embodiment 3 of this disclosure is described.

In Embodiment 3, the third image that is displayed is varied in association with the number of image exchanges or the like in the image exchange in Embodiment 1. In other words, Embodiment 3 replaces the element of time in Embodiment 2 with an element of frequency of image exchange.

In Embodiment 1, an example of receiving the second request for image transmission after the first request for image transmission was described. During actual message exchange, however, it is envisioned that text messages will also be exchanged between exchanges of images. It is also conceivable that after the first request for image transmission, the server 30 may receive a second request for image transmission not forming a predetermined combination one or more times and then receive a second request for image transmission that forms a predetermined combination.

Therefore, assuming such cases, Embodiment 3 prescribes the number of exchanges of images or text allowed between receipt, by the server 30, of the first request for image transmission and the second request for image transmission that form a predetermined combination for transmitting the third image data. In this case, the server 30 may transmit the third image data when, between the first request for image transmission and the second request for image transmission, the number of times that a request for image transmission or request for text transmission is received from the first communication terminal 10 or the second communication terminal 20 is within a predetermined number.

If the allowed number of image or text exchanges is set to an excessively high number, the third image may be displayed out of the blue after a variety of images have been exchanged and the users have already lost interest in the first and second images. Accordingly, during regular use, it is considered preferable to set the allowable number of image or text exchanges to a relatively small number, such as two or three.

This approach can be expected to provide the communication partner with an incentive to respond quickly to a transmitted image, without exchanging images or text with little relevance.

In Embodiment 1, text exchange is not described in detail as a form of message exchange, yet such text exchange may be implemented with a technique similar to a known message exchange, such as chat. Furthermore, text exchange may be implemented by replacing the word "image" in Embodiment 1 with "text" that is constituted by a character string or the like. In this case, first text data are included in the request for text transmission transmitted from the first communication terminal 10 to the server 30. Upon receiving the first request for text transmission, the server 30 transmits the first text data to the second communication terminal 20. When receiving the first text data from the server 30, the second communication terminal 20 displays first text based on the first text data on the display 22.

As in Embodiment 2, a different third image may be displayed in accordance with the number of times an image or text is exchanged from when the server 30 receives the first request for image transmission until the server 30 receives the second request for image transmission. In this case, the server 30 may transmit different third image data in accordance with the number of times, between the first request for image transmission and the second request for image transmission, that a request for image transmission or request for text transmission is received from the first communication terminal 10 or the second communication terminal 20. When implementing this embodiment as well, the server 30 needs to store, in the memory 32, associations between different third image data and the corresponding number of times that an image or text is exchanged from receipt of the first request for image transmission until receipt of the second request for image transmission.

With this approach, even if the images that users exchange are the same as before, the third image differs in accordance with the number of times an image or a message is exchanged between the exchange of images that form a predetermined combination. Therefore, the effect of maintaining user interest in image exchange can be expected. Hence, a further increase in the user's motivation to use the communication system of Embodiment 3 can be expected.

Embodiment 4

Next, a communication system according to Embodiment 4 of this disclosure is described.

Embodiment 4 adds a lottery-like mechanism to the image exchange in Embodiment 1. In other words, Embodiment 4 adds a gaming element in which the user transmitting an image designates a correct choice in advance, and the user receiving the image attempts to guess the designated correct choice from among available choices.

In Embodiment 4, the first communication terminal 10 (the side transmitting an image) transmits, to the server 30, a first request for image transmission that includes the choice that the user has selected in advance as the correct choice. After the second communication terminal 20 (side that receives the image) receives the first image data corresponding to the first request for image transmission, the user selects an image that the user thinks is the correct choice from among the attached choices. The second communication terminal 20 then transmits the selected image to the server 30 as the second request for image transmission. After receiving the second request for image transmission, the server 30 transmits the corresponding third image data (for example, image data indicating that the choice was correct) when the correct choice selected on the first communication terminal 10 and the choice selected on the second communication terminal 20 match. Conversely, when the correct choice selected on the first communication terminal 10 does not match the choice selected on the second communication terminal 20, the server 30 either does not transmit the third image data or transmits third image data indicating that the choice was incorrect.

In this case, the first communication terminal 10 transmits, to the server 30, first selection data representing a choice on the first communication terminal 10 from among the choices suggested by the first image based on the first image data corresponding to the first request for image transmission. The second communication terminal 20 transmits, to the server 30, second image data corresponding to the second request for image transmission as second selection data representing a choice on the second communication terminal 20 from among the choices suggested by the first image. The server 30 transmits different third image data in accordance with whether the choice represented by the first selection data and the choice represented by the second selection data match.

FIGS. 10A to 10E illustrate a specific example of image display in Embodiment 4. Like FIGS. 6A through 8, FIGS. 10A to 10E illustrate examples of screens displayed on the display 12 in the first communication terminal 10 and the display 22 in the second communication terminal 20.

Figure 10A:
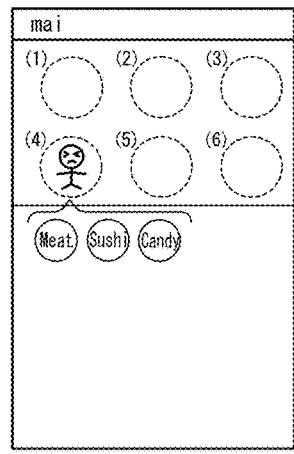
FIG. 10A to 10E illustrate an example of operations by a communication terminal according to Embodiment 4.

As illustrated in FIG. 10A, in Embodiment 4, once the first image is selected by the user, choices corresponding to the first image are displayed on the display 12 of the first communication terminal 10. The example illustrated in FIG. 10A shows a state in which the user has selected image (4). Image (4) is an illustration in which a character represents a feeling such as "I'm hungry". The choices corresponding to image (4) are "meat", "sushi", and "candy", which are displayed as choices of foods that the user wants to eat. In sum, in the example illustrated in FIG. 10A, the user mai of the first communication terminal 10 makes the user taro of the second communication terminal 20 answer a quiz about what mai wants to eat.

The actual display of these choices is preferably not in the form of writing, but rather images that suggest the content represented by the choices. Furthermore, these choices may be prescribed in advance, or the user may be allowed to select several from among a larger number of choices. The number of choices is not limited to being three.

In the example illustrated in FIG. 10A, it is assumed that the user mai of the first communication terminal 10 has selected "candy" from among the choices corresponding to image (4). The first communication terminal 10 then transmits information (first selection data) indicating that "candy" was selected from among the choices along with the first request for image transmission to the server 30. Upon receiving the first request for image transmission, the server 30 transmits the first image data corresponding to the first request for image transmission to the second communication terminal 20 along with the corresponding choices.

Figure 10D:
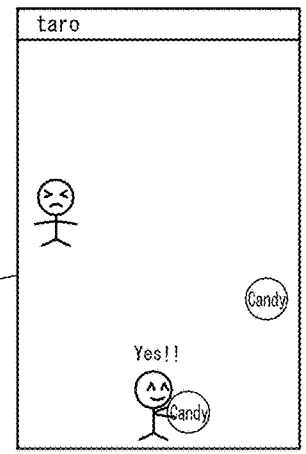
Figure 10B:
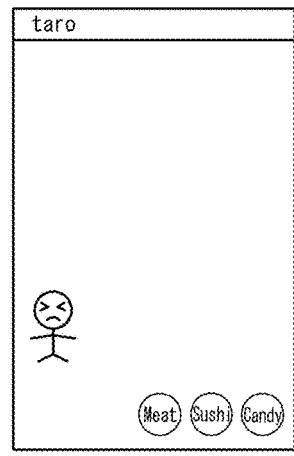

Upon receiving the first image data, the second communication terminal 20 displays the first image corresponding to the first image data along with the corresponding choices on the display 22 of the second communication terminal 20, as illustrated in FIG. 10B, and prompts the user taro of the second communication terminal 20 to make a selection from among the choices.

In the screen display in FIG. 10B, assume that the user taro expects "candy" to be the correct choice from among the choices of "meat", "sushi", and "candy" and selects the image of "candy". The second communication terminal 20 then treats the image data of "candy", which is the second image data, as second selection data and transmits the second request for image transmission to the server 30.

Figure 10E:
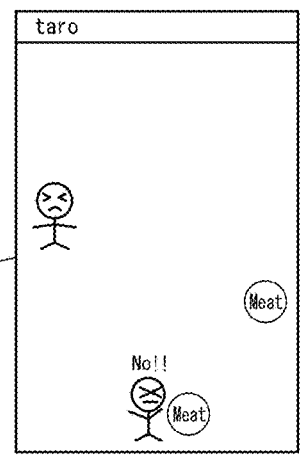
Figure 10C:
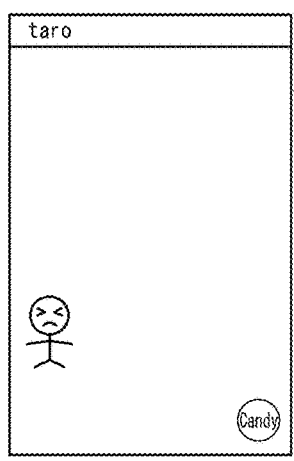

Upon receiving the second request for image transmission, the server 30 transmits the image data of "candy", which is the second image data, to at least the first communication terminal 10 and preferably to the second communication terminal 20 as well. FIG. 10C illustrates a state in which the second communication terminal 20, which has received the second image data, displays the second image "candy" based on the second image data on the display 22.

In this case, the choice represented by the first selection data and the choice represented by the second selection data match, since both are "candy". Therefore, as the third image, the server 30 transmits data of an image indicating that the choice was correct to the first communication terminal 10 and the second communication terminal 20. FIG. 10D illustrates a state in which the second communication terminal 20, which has received the third image data, displays the third image based on the third image data on the display 22.

On the other hand, in the screen display in FIG. 10B, assume that the user taro expects "meat" to be the correct choice from among the choices of "meat", "sushi", and "candy" and selects the image of "meat". The second communication terminal 20 then treats the image data of "meat", which is the second image data, as second selection data and transmits the second request for image transmission to the server 30. Upon receiving the second request for image transmission, the server 30 transmits the image data of "meat", which is the second image data, to at least the first communication terminal 10 and preferably to the second communication terminal 20 as well.

In this case, the choice represented by the first selection data, "candy", and the choice represented by the second selection data, "meat", do not match. Therefore, as the third image, the server 30 transmits data of an image indicating that the choice was incorrect to the first communication terminal 10 and the second communication terminal 20. FIG. 10E illustrates a state in which the second communication terminal 20, which has received the third image data, displays the third image based on the third image data on the display 22.

By thus adding a lottery-like gaming element to image exchange in Embodiment 4, an element of entertainment is added, and a further increase in the user's motivation to use the communication system of Embodiment 4 can be expected.

In Embodiment 4, each time the user of the second communication terminal 20 consecutively selects the correct choice that was selected by the user of the first communication terminal 10, the image or animation displayed as the third image may become more elaborate.

The following further describes the effects of the disclosed communication system.

According to the disclosed communication system, the effect of strengthening the emotional connection between users that exchange images using the communication system can be expected. In other words, according to the disclosed communication system, if communicating users can appropriately infer each other's feelings and exchange images that match those feelings, a new development that heightens such mutual feelings is provided. Accordingly, it can be expected that after such image exchange, users will have the impression of being emotionally connected.

In conventional message exchange, a user transmits text, images, or the like unilaterally to another user. Therefore, users can transmit text that represents their emotions in writing, or images, such as illustrations, that match their feelings, to the other user. However, users merely transmit such text or images to each other. According to the disclosed communication system, a new image is provided based on the images that users transmit to each other, thereby stimulating the interest of users that exchange messages and increasing the users' motivation to exchange messages.

Although the disclosed embodiments have been described based on drawings and examples, it is to be noted that various changes and modifications will be apparent to those skilled in the art based on this disclosure. Therefore, such changes and modifications are to be understood as included within the scope of this disclosure. For example, the functions and the like included in the various functional components, means, steps, and the like may be reordered in any logically consistent way. Furthermore, functional components, steps, and the like may be combined into one or divided. Also, the disclosed embodiments are not limited to being implemented exactly as described above, and characteristics thereof may be combined as appropriate.

For example, in the above explanation, a communication system is disclosed, yet this disclosure is not limited to a communication system and may also be applied to a method of controlling a communication system such as the one described above. This disclosure may also be applied to a server in a communication system such as the one described above and to a method of controlling such a server. Furthermore, this disclosure may be applied to a program executed on a computer (such as a control processor of the communication terminal) that controls a communication terminal communicating with another communication terminal via a server.

In the above embodiments, it is assumed that when the first request for image transmission and the second request for image transmission are a predetermined combination, the third image data are transmitted immediately. However, the timing at which the third image data are transmitted from the server 30 and the timing at which the third image based on the third image data is displayed on the first communication terminal 10 and the second communication terminal 20 may be set freely. For example, the third image may be displayed once a predetermined length of time has passed from display of the second image on the first communication terminal 10 or the second communication terminal 20. Furthermore, in each communication terminal, even if the third image data have already been received, display of the third image may be delayed until launching of the application for exchanging images. In particular, when the third image is an animated video or the like, the video may be played back based on user input, and the user may be allowed to replay the video.

In the above embodiments, the determination of whether to transmit the third image data from the server 30 is made based on the balance between the first request for image transmission and the second request for image transmission. As a modification to the disclosed embodiments, however, the determination of whether to transmit the third image data may, for example, be made based on combinations of first requests for image transmission that are transmitted consecutively to the server 30 from the first communication terminal 10. In other words, not only when a plurality of users are exchanging messages, but also when a certain user transmits images consecutively, the third image may be displayed based on a combination of these images.

Two users exchange images in the above embodiments, yet three or more users may exchange images, and three or more communication terminals may be performing the image exchange.

Furthermore, in the above embodiments, after the third image is displayed, another set of third image data may be provided in response to transmission, to the server 30, of a request for image transmission corresponding to an image that forms a predetermined combination with the first or the second image.

In the above embodiments, after the third image is displayed, image data corresponding to fourth image data, for example, may be further provided in response to transmission, to the server 30, of a request for image transmission corresponding to an image that forms a predetermined combination with the third image.

In Embodiment 4, the server is described as determining whether the choices represented by the selection data transmitted from the communication terminals match. This disclosure is not, however, limited to such an embodiment. For example, a configuration may be adopted to transmit the selection data from one communication terminal to another communication terminal via the server 30, and the other communication terminal may determine whether the choices represented by the selection data of the communication terminals match.

REFERENCE SIGNS LIST

1 Communication system
10 First communication terminal
11 Communication interface
12 Display
13 User interface
14 Memory
15 Control processor
20 Second communication terminal
21 Communication interface
22 Display
23 User interface
24 Memory
25 Control processor
30 Server (message exchange server)
31 Communication interface
32 Memory
321 Image correspondence table
322 Image data
33 Control processor

The invention claimed is:

1. A server comprising
circuitry configured to:
receive a first signal relating to a first image from a first communication terminal;
receive a second signal relating to a second image from the first communication terminal or from a second communication terminal different form the first communication terminal; and
transmit third image data corresponding to a third image different from the first image and the second image to an origin communication terminal which has transmitted the first signal and the second signal to the server when the first image and the second image satisfy a certain combination requirement that is determined by comparing a combination of the first and second images against a plurality of predetermined combinations of images to determine whether the certain combination requirement is satisfied, wherein
when the server receives the second signal from the first communication terminal, the origin communication terminal is the first communication terminal, and
when the server receives the second signal from the second communication terminal, the origin communication terminal is both the first communication terminal and the second communication terminal,
wherein the third image is different from the first image and second image at least in that neither of the first and second images are included in the third image.

2. The server according to claim 1, wherein
the first signal and the second signal are consecutively transmitted, and
when the consecutively transmitted first signal and the second signal satisfy the certain combination, the circuitry is configured to transmit a third signal.

3. The server according to claim 1, wherein
the first signal is a signal to request the first image,
the second signal is a signal to request the second image,
the circuitry is further configured to:
transmit, to the first communication terminal, a first image data corresponding to the first image when the circuitry receives the first signal; and
transmit, to the origin communication terminal, a second image data corresponding to the second image when the circuitry receives the second signal.

4. A communication terminal comprising circuitry configured to:
transmit a first signal relating to a first image;
transmit a second signal relating to a second image; and
receive a third image data corresponding to a third image different from the first image and the second image when the first image and the second image satisfy a certain combination requirement that is determined by comparing a combination of the first and second images against a plurality of predetermined combinations of images to determine whether the certain combination requirement is satisfied,
wherein the third image is different from the first image and second image at least in that neither of the first and second images are included in the third image.

5. The communication terminal according to claim 4, wherein the circuitry is further configured to consecutively transmit the first signal and the second signal.

6. The communication terminal according to claim 4, wherein
the first signal is a signal to request the first image,
the second signal is a signal to request the second image,
the circuitry is further configured to receive a first image data corresponding to the first image and a second image data corresponding to the second image.

7. The communication terminal according to claim 6, wherein the first image, the second image and the third image are displayed in this order.

8. The communication terminal according to claim 6, wherein
the first image is displayed,
the second image is displayed below the first image, and
the third image is displayed below the second image.

9. The communication terminal according to claim 4, wherein
a plurality of images are displayed, and the circuitry is configured to set an image selected by a user among the plurality of images as the first image.

10. A method comprising:

receiving, using circuitry, a first signal relating to a first image from a first communication terminal;

receiving, using the circuitry, a second signal relating to a second image from the first communication terminal or from a second communication terminal different form the first communication terminal; and transmitting, using the circuitry, third image date corresponding to a third image different from the first image and the second image to an origin communication terminal which has transmitted the first signal and the second signal to server when the first image and the second image satisfy a certain combination requirement that is determined by comparing a combination of the first and second images against a plurality of predetermined combinations of images to determine whether the certain combination requirement is satisfied, wherein when the circuitry receives the second signal from the first communication terminal, the origin communication terminal is the first communication terminal, and when the circuitry receives the second signal from the second communication terminal, the origin communication terminal is both the first communication terminal and the second communication terminal, wherein the third image is different from the first image and second image at least in that neither of the first and second images are included in the third image.

11. A non-transitory computer-readable medium comprising instructions that, when executed on a computing device, control the computing device to be configured to:

receive a first signal relating to a first image from a first communication terminal;

receive a second signal relating to a second image from the first communication terminal or from a second communication terminal different form the first communication terminal; and transmit third image date corresponding to a third image different from the first image and the second image to an origin communication terminal which has transmitted the first signal and the second signal to server when the first image and the second image satisfy a certain combination requirement that is determined by comparing a combination of the first and second images against a plurality of predetermined combinations of images to determine whether the certain combination requirement is satisfied, wherein when the computing device receives the second signal from the first communication terminal, the origin communication terminal is the first communication terminal, and when the computing device receives the second signal from the second communication terminal, the origin communication terminal is both the first communication terminal and the second communication terminal, wherein the third image is different from the first image and second image at least in that neither of the first and second images are included in the third image.

12. A method comprising:

transmitting, using circuitry, a first signal relating to a first image;

transmitting, using the circuitry, a second signal relating to a second image; and receiving, using the circuitry, a third image data corresponding to a third image different from the first image and the second image when the first image and the second image satisfy a certain combination requirement that is determined by comparing a combination of the first and second images against a plurality of predetermined combinations of images to determine whether the certain combination requirement is satisfied, wherein the third image is different from the first image and second image at least in that neither of the first and second images are included in the third image.

13. A non-transitory computer-readable medium comprising instructions that, when executed on a computing device, control the computing device to be configured to:

transmit a first signal relating to a first image;

transmit a second signal relating to a second image; and receive a third image data corresponding to a third image different from the first image and the second image when the first image and the second image satisfy a certain combination requirement that is determined by comparing a combination of the first and second images against a plurality of predetermined combinations of images to determine whether the certain combination requirement is satisfied, wherein the third image is different from the first image and second image at least in that neither of the first and second images are included in the third image.

* * * * *